Oct. 24, 1939.  W. F. PUNTE  2,177,029
SHEET METAL CAN BODY
Filed Sept. 4, 1937
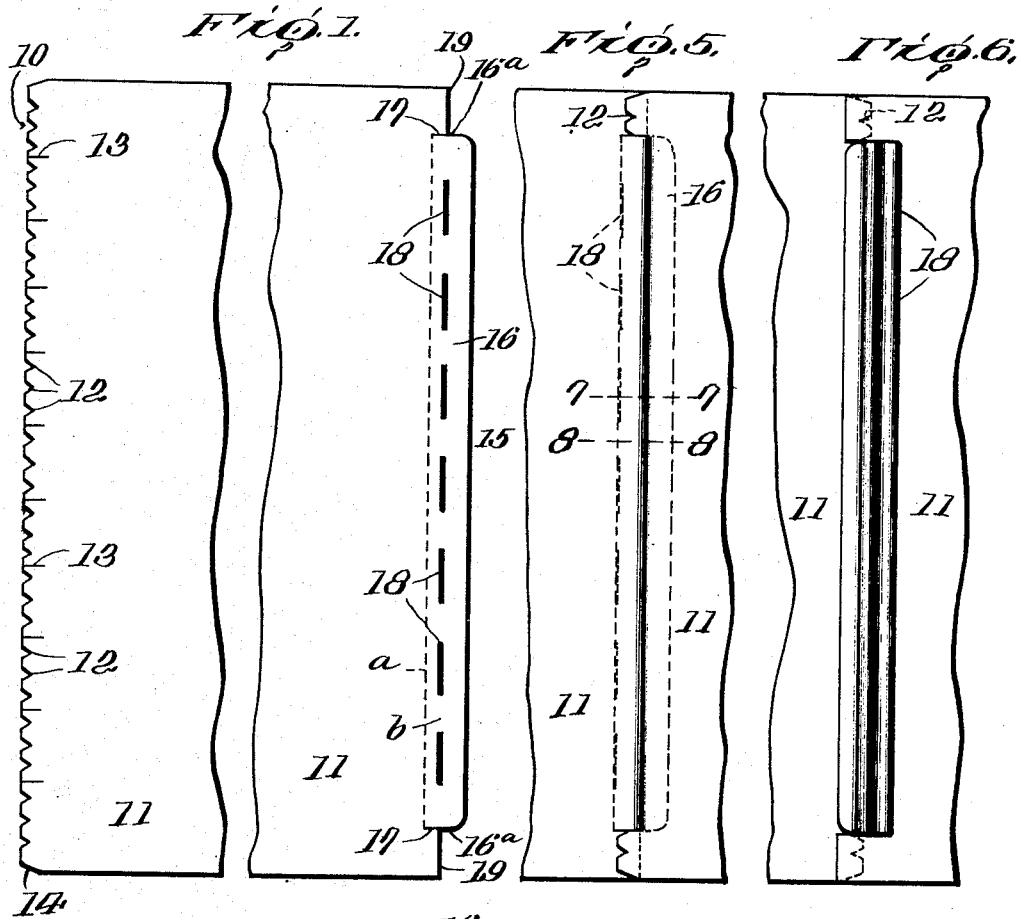
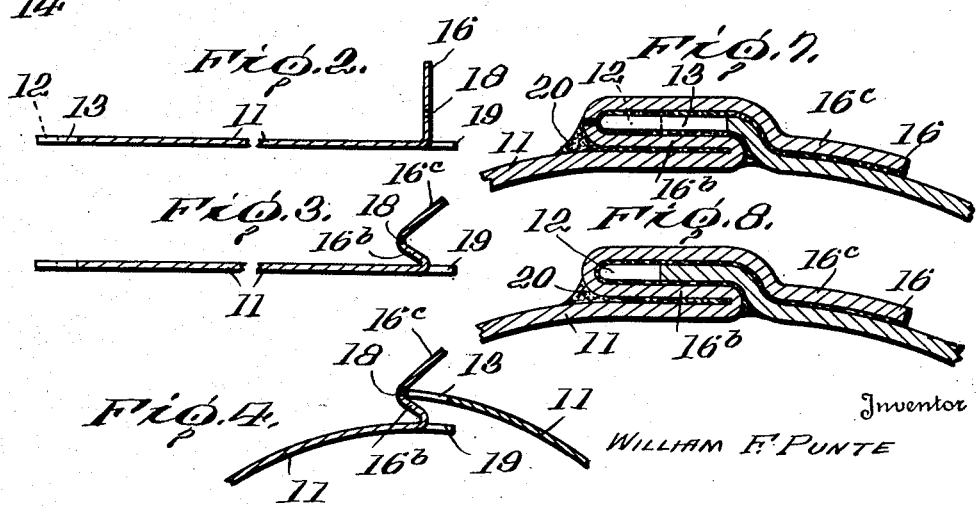
Inventor
WILLIAM F. PUNTE
By Mason & Porter
Attorneys Patented Oct. 24, 1939

2,177,029

UNITED STATES PATENT OFFICE 2,177,029

SHEET METAL CAN BODY

William F. Punte, Syracuse, N. Y., assignor to Continental Can Company, Inc., New York, N. Y., a corporation of New York Application September 4, 1937, Serial No. 162,535

1 Claim. (Cl. 220—76)

The present invention relates to new and useful improvements in a sheet metal can body, and more particularly to improvements in the solder bonded side seam thereof.

In using cans for the packaging of certain liquids, such as beer, it is common practice to subject the contents of the can to a sterilizing heat after the can has been sealed. This heating of the sealed can develops an extremely high internal pressure and it is, therefore, important and essential that cans used for this purpose should have a correspondingly strong side seam.

The pressure of the liquid is exerted equally in all direction so that a substantially tangential strain is imposed on the side seam. When the usual lock seam is employed, that is, a seam having the customary interengaging hooks, the tangential strain exerted thereon tends to unfold the hooks and this results in the imposition of a direct tensile strain on the solder bond between the interengaged faces of the hooks. This tensile strain often results in the rupturing of the solder bond. A lap seam, as distinguished from a lock seam, offers more resistance to a tangential strain because the stresses imposed on the solder bond are primarily of a shearing character. The side seam is usually formed by lapping one edge portion of the blank over the other edge portion thereof and applying solder between the adjacent faces. With this type of lap seam, the extent of the solder bond is limited by the lapping portions of the can blank.

In the co-pending application of William F. Punte, Serial No. 103,434, filed September 30, 1936, there is shown and described a form of side seam which is materially stronger than the usual side seam and is, therefore, particularly well adapted for use on cans employed for holding beer or the like, and it is a particular object of the present invention to provide certain improvements over the aforesaid application in connection with side seams for metal cans.

The invention aims to provide an improved side seam for metal can bodies, wherein the edge portions of the body blank are so shaped and lapped as to provide an extended surface for the solder bond and to greatly facilitate the application of the solder between the contacting portions of the seam.

A still further object of the invention is to provide an improved side seam for metal can bodies, wherein the application and penetration of the solder to all portions of the lapping surfaces of the seam are facilitated by the provision of slits and cut-out portions on the opposite edges of the body blank.

The above and other objects of the invention will in part be obvious and will be hereinafter more fully pointed out.

In the accompanying drawing:

Figure 1 is a fragmentary plan view of the flat body blank.

Figure 2 is an enlarged side sectional view of the flat body blank with one of the edges thereof positioned after the initial forming operation.

Figure 3 is a view, similar to Figure 2, showing the position of the edge of the body blank after a subsequent forming operation.

Figure 4 is a fragmentary side view, in section, showing the opposite or notched edge of the body blank in position relative to the pre-shaped edge thereof.

Figure 5 is an elevation of the completed seam after it has been bumped, as viewed from the inside of the can body.

Figure 6 is a view, similar to Figure 5, but showing the seam as viewed from the outside of the can body.

Figure 7 is an enlarged sectional view taken along the line 7—7 of Figure 5.

Figure 8 is an enlarged sectional view taken along the line 8—8 of Figure 5.

Referring more in detail to the accompanying drawing, and particularly to Figures 1, 2 and 3, the edge 10 of the body blank 11 is provided with a series of notches 12, groups of which are separated by slits 13 extending longitudinally of the body blank. The ends of the edge 10 are tapered, as at 14. The opposite edge 15 of the body blank 11 is provided with a projecting tongue portion 16, the longitudinal edges 16a of which are disposed within the outer edges of the body blank. The body blank is provided with slits 17 so that the edges 16a of the projecting portion 16 extend within the body blank. The projecting portion 16 is provided with a plurality of spaced slits 18 disposed in substantial alignment with the outer edge portions 19 of the body blank.

As shown in Figure 2, the tongue or projecting portion 16 is bent along a line $a$ joining the inner extremities of the slits 17. The projecting portion 16 is then further bent, as in Figure 3, so that the portion 16b is disposed at an acute angle with respect to the body blank and so that the portion 16c is reversely bent and also disposed at an acute angle with respect to the body blank. The portion 16c is bent along a line $b$ which includes the transverse slits 18. When this edge of the body blank has been formed, the blank is bent around a horn so that the opposite edge 10 thereof is disposed at the position shown in Figure 4. In this position of the body blank, the edge 10, which includes the notches 12 and longitudinal slits 13, is disposed within the bight between the portions 16b, 16c of the tongue portion 16. The edge portions of the body blank are now subjected to a forming operation which causes the portions 16b, 16c of the tongue 16 to enclose the edge portion 10 of the body blank. The seam is then bumped so that the parts assume the position shown in Figures 7 and 8. As shown, an outwardly extending side seam is thus provided.

It is of course understood that the outer ends or corner portions 19 of the body blank are lapped with respect to the opposite edge 10 of the body blank so as to facilitate the subsequent flanging of the ends of the can body and the sides of the end closures to the can in a manner which is well known.

When solder is applied to the space between the portion 16b of the tongue 16 of the body blank, it will flow by capillary attraction to all parts of the seam. A portion of the solder will flow between the adjacent edges of the body blank and of the portion 16b. Some of the solder will also flow through the slits 18 and thence to opposite sides of the edge 10 so that both the portions 16b and 16c are solder bonded to the edge 10. The notches 12 and the slits 13 in the edge 10 of the body blank facilitate the free flowing of the solder to all parts of the seam. Thus, solder will also flow to the space between the body blank and the extreme edge portion 16c of the tongue 16. The provision of the slits and notches prevent the possible trapping of gases in the seam so that damming up of the solder is effectively prevented.

It will be apparent that a side seam constructed in the manner heretofore described is an exceptionally strong one, and one which is well adapted to withstand exceedingly high internal pressures. It will also be noted that the solder bond is applied over a greatly extended surface and, since a solder bond is particularly resistant to shearing stresses, the strength of the seam of the present invention is correspondingly increased.

It is to be clearly understood that various changes in the details of construction and arrangement of parts may be made without departing from the scope of the invention as set forth in the appended claim.

I claim:

A sheet metal can body having a solder bonded side seam, one edge of the body blank being folded back upon the outer face of the body wall and reversely folded so as to extend beyond the first fold line and having a plurality of transverse slits along the fold line joining the two said folded portions, the opposite edge of the body blank extending into the bight between the said folded portions and having notches and longitudinal slits adapted to communicate with the said transverse slits whereby to facilitate the application of solder to all parts of the seam and a solder bond joining the contacting portions of the body blank.

WILLIAM F. PUNTE.